United States Patent Office 3,351,477
Patented Nov. 7, 1967

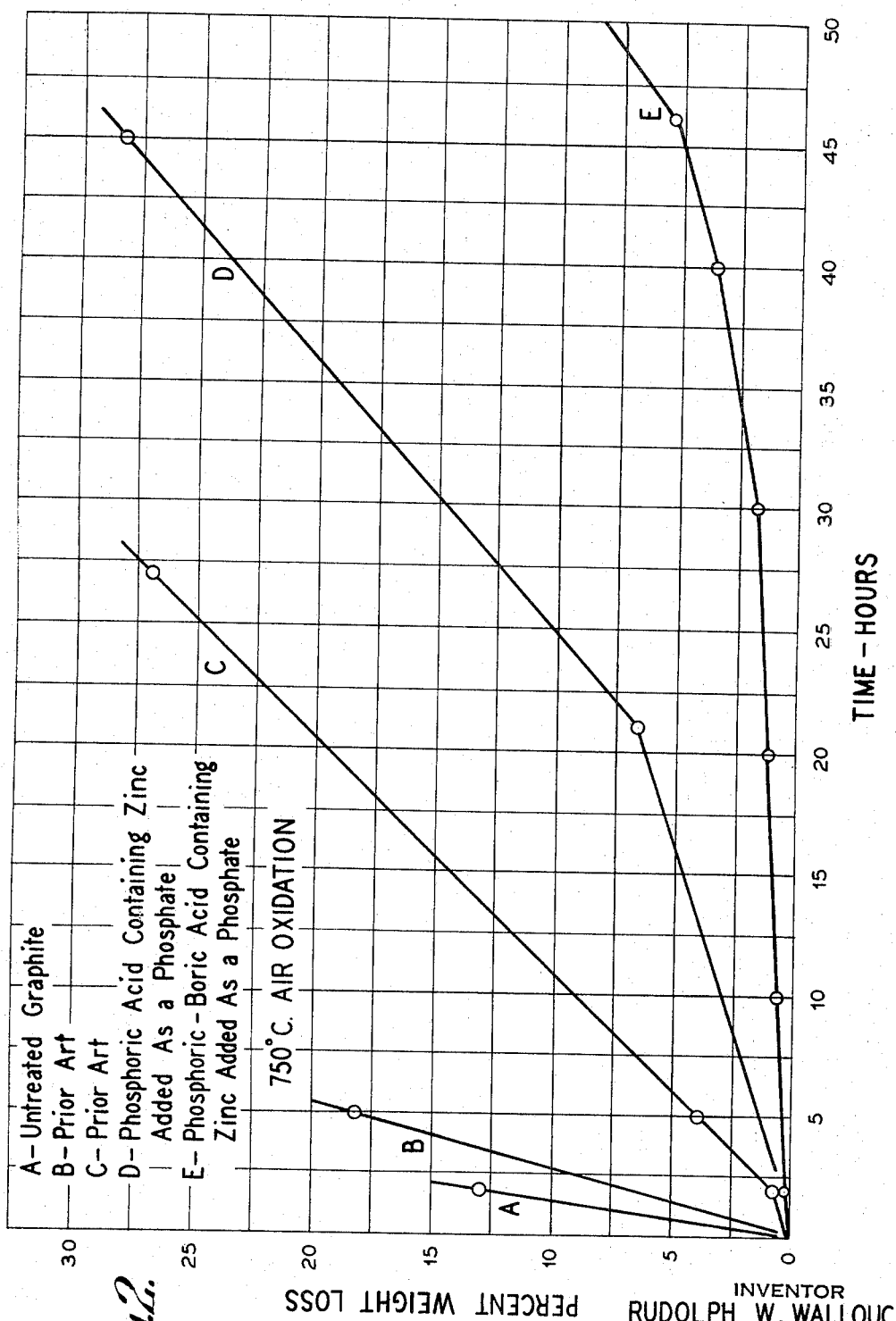

3,351,477
**TREAT SOLUTION FOR RENDERING CAR-
BONACEOUS ARTICLES OXIDATION
RESISTANT**
Rudolph W. Wallouch, Lewiston, N.Y., assignor to Union
Carbide Corporation, a corporation of New York
Filed Jan. 27, 1966, Ser. No. 523,343
7 Claims. (Cl. 106—56)

ABSTRACT OF THE DISCLOSURE

A treat solution to be applied to a carbonaceous article to impart oxidation resistance to the article, the treat solution comprising water, phosphoric acid, boric acid, and either zinc oxide or zinc phosphate in various weight proportions. A method of impregnating a carbonaceous article with a composition consisting of boric anhydride, phosphoric pentoxide and zinc oxide in specific molar ratios.

---

Figure 1:
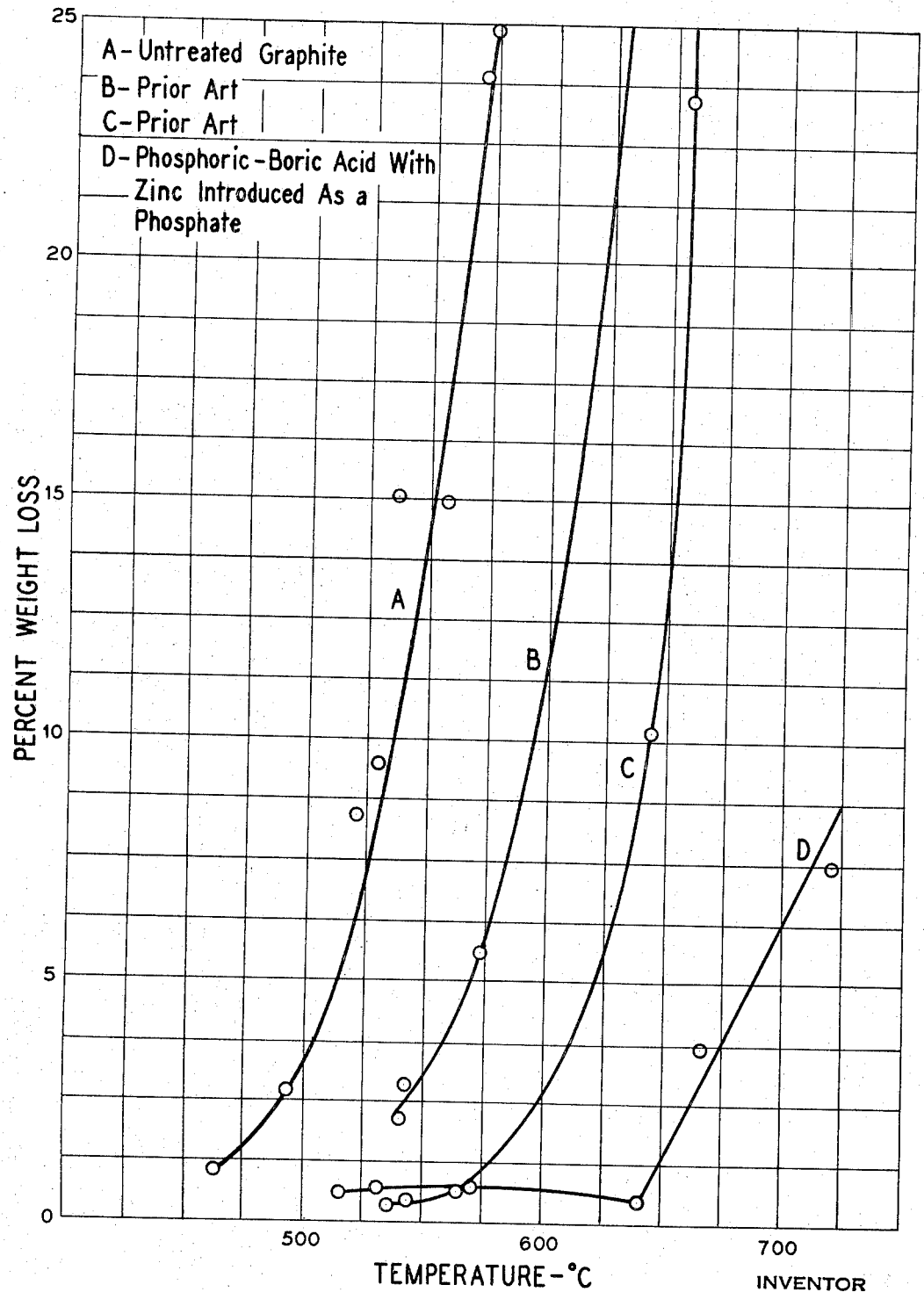

This invention relates to carbonaceous articles having an oxidation resistant composition incorporated therein and more particularly, relates to a treat solution which is used for rendering carbonaceous articles oxidation resistant.

Because of the frequent uses made of carbon and graphite bodies in furnace linings and other high temperature applications in the presence of materials which exert an oxidizing influence on their surroundings, it is necessary that such articles posses resistance to oxidation at high temperature.

A great many methods have been devised to render carbon articles oxidation resistant, but their success has not been such that the problem no longer confronts industry. Among the various additives used as oxidation retardants have been diverse phosphorus-containing compounds. The prior art has amply taught that phosphoric acid tends to increase the oxidation resistance of carbonaceous bodies. It has been found also that many organic phosphates as well as the phosphate salts of sodium, aluminum, calcium, potassium and magnesium are effective oxidation reducing additives. In general, however, methods of protection, depending upon the above-mentioned additives, are neither exceptionally effective nor long lasting in effect.

A most recent method for producing oxidation resistant carbon articles is the subject of U.S. Patent 2,906,632. This method consists of placing about 4 to about 20 percent by weight of a zinc phosphate composition in the pores of a carbon or graphite article, the composition being composed of at least one phosphorus-containing compound selected from the group consisting of the oxy acids of phosphorus and the ammonium salts of phosphorus, a zinc halide, and boric acid in a weight ratio between 2:1:0 and 2:2:0.25. Best results are achieved when mono-basic ammonium phosphate, zinc chloride and boric acid are used in a molar ratio of 3:1:0.25. These constituents are dissolved in order: boric acid, ammonium phosphate; and zinc chloride in a 1.5 percent solution of hydrochloric acid, each constituent being dissolved prior to the addition of the next. The solution is kept acid to prevent the precipitation of zinc phosphate. Once the solution is prepared the carbon or graphite article is treated by dipping it into the solution or by vacuum impregnation.

While the above-described process has been more successful than other prior art techniques, several difficulties are associated with the process. The use of hydrochloric acid as the solvent requires the use of expensive stainless steel handling equipment since a mild steel is corroded by the acidic solution. Furthermore, solutions prepared in accordance with the aforementioned process have a limited solubility for active ingredients and concentrations greater than 30% by weight tend to precipitate out. Such precipitation is disadvantageous since the effectiveness of oxidation treatments is greatly dependent upon the quantity of oxidation inhibitor composition which is deposited in the graphite body.

Bearing in mind the above outlined limitations of prior art attempts to render carbon and graphite bodies oxidation resistant, the primary object of the present invention is to provide a treat solution for rendering such articles oxidation resistant at temperatures up to 950° C.

An equally important object of the invention is to provide articles composed of carbon and graphite, which possess improved resistance to oxidizing conditions at temperatures up to 950° C.

These and other objects and advantages of the invention will become apparent from the following description taken in conjunction with the accompanying drawing, wherein FIGURE 1 is a graphical representation relating the effects of temperature of the oxidation rates of samples treated by the solution of the invention as well as by prior art oxidation retardants;

FIGURE 2 is a graphical representation of the oxidation rates of samples which were treated by the solution of the invention as well as those treated with various prior art and oxidation retardants.

Broadly, the objects of the invention are accomplished by providing in carbon or graphite articles a composition which will form a phosphate glass of zinc in the pores of the articles imparting oxidation resistance to the articles at temperatures of between about 450° C. and about 950° C. The reagents which are required to form the phosphate glass are included in a treatment which may be introduced into the carbonaceous articles by vacuum impregnation in any production autoclave, by brushing, spraying or by dipping the articles into the treatment.

At elevated temperatures the glass is a very viscous liquid which wets unoxidized carbon surfaces and spreads through the carbon matrix to provide a barrier between the carbon and the surrounding atmosphere and to tie up catalytic ash constituents by the formation of stable phosphates.

Agents suitable for the practice of the invention include zinc phosphate or zinc oxide, phosphoric acid and boric acid. Preparation of a proper solution or treatment is obtained by dissolving zinc phosphate or zinc oxide in phosphoric acid. It is essential that the zinc compound is completely soluble in phosphoric acid and able to form zinc phosphate in solution. The use of zinc phosphate or zinc oxide affords an increase in concentration of active ingredients in the treatment, as compared with the zinc halide-containing treatment of U.S. Patent 2,906,632, thereby providing greater protection to the carbon article to which the treatment is applied. Boric acid is then added to the treatment in a suitable quantity. Boric acid may be eliminated if desired, the elimination generally causing greater oxidation protection above 700° C. and poorer protection below 700° C. in the carbon article. Other ingredients, such as Boric anhydride ($B_2O_3$), boro-silicate glass, boro-phosphoric acid ($BPO_4$), ammonium borate and other boron compounds, may be substituted for the boric acid without adversely affecting the effectiveness of the treatment.

The solution of the invention does not contain hydrochloric acid as a solvent for the reagents, thereby facilitating handling and applicating procedures. A most important feature of the invention, however, is the use of zinc oxide or zinc phosphate as a reagent. The use of these particular compounds permits a treat solution having a greater concentration of active glass forming ingredients to be prepared. Application of this treat solution to a carbon or graphite article results in a greatly improved oxidation resistant article.

The preferred composition which is incorporated in the carbonaceous article to be treated is composed of the following ingredients:

|  | P.p.h. |
|---|---|
| Water ($H_2O$) | 46.73 |
| Boric anhydride ($B_2O_3$) | 0.56 |
| Phosphorus pentoxide ($P_2O_5$) | 38.96 |
| Zinc oxide (ZnO) | 13.75 |

The composition loses its water content upon moderate heating in air. For proper oxidation protection the boron-zinc phosphate ratio in the composition is important and should include the following molar ratios:

TABLE 1

| $B_2O_3$ | ZnO | $P_2O_5$ |
|---|---|---|
| 0 | 1 | 1 |
| 0.5 | 0.5 | 1 |
| 0.4 | 0.6 | 1 |
| 0.3 | 0.7 | 1 |
| 1.0 | 1.0 | 1 |
| 0 | 2.0 | 1 |

In order to prepare 100 lbs. of the preferred treat solution (specific gravity=1.726) the following materials are mixed in the order and quantities (in pounds) given below:

|  | Min. | Preferred | Max. |
|---|---|---|---|
| Water ($H_2O$) | 19.9 | 21.9 | 24 |
| Boric Acid Powder ($H_3BO_3$) | 0.98 | 1.00 | 1.03 |
| (85%) Acid Phosphoric ($H_3PO_4$) | 61.0 | 63.3 | 65 |
| Zinc Oxide (ZnO) | 13 | 13.8 | 14 |

In the event that zinc phosphate is used, the following quantities are mixed to make up 100 lbs. of treatment:

|  | Min. | Preferred | Max. |
|---|---|---|---|
| Water ($H_2O$) | 24.5 | 27 | 29.3 |
| Boric Acid Powder ($H_3BO_3$) | 0.98 | 1.0 | 1.03 |
| (85%) Acid Phosphoric ($H_3PO_4$) | 48.3 | 50.3 | 52.2 |
| Zinc Phosphate Powder ($Zn_3(PO_4)_2$) | 21.3 | 21.7 | 22.4 |

The specific gravity of the treat solution may be varied from about 1.59 to about 1.77 by introducing various amounts of zinc oxide or zinc phosphate into the phosphoric acid solution.

It has been found that the best results are obtained from the treatment if the ingredients are used in the aforementioned weight ratio and if they are mixed in the specified amount of water and in the given order. In order to speed the penetration of the treat solution into the pores of the carbon or graphite article to be treated, 0.1% by weight of a commercially available wetting agent may be added to the final solution.

It has been discovered that a direct relationship exists between the effectiveness of phosphate inhibitors and the quantity of phosphate deposited in the carbonaceous material, all other factors being kept constant such as oxidation environment type and accessible surface of the combustible base material, etc. In addition, the effectiveness of anti-oxidants is also dependent upon the end use of the treated article. Maximum results are achieved if proper impregnation procedures are employed. Vacuum pressure impregnation is preferred, a typical impregnation cycle being detailed as follows:

(1) Evacuate the impregnation vessel containing the carbon or graphite article and hold under a vacuum for 15 minutes.

(2) Admit treat solution to the vessel with a vacuum applied during the filling operation.

(3) Cover the article with treat solution under a vacuum; then break the vacuum and pressurize for one hour to 100 p.s.i.g. pressure.

(4) After pressurizing, remove the treat solution from the vessel and allow the article to drain.

(5) Dry the vacuum impregnated article at 105° C. for 16 hours.

(6) Apply a fast 500° C. bake for 20 minutes in neutral atmosphere to the impregnated article.

Although spraying or dipping may be employed to apply the treat solution, best results have been achieved by carrying out the above-described procedure.

A series of tests were performed in order to measure the effectiveness of the treat solution of the invention. In the first of these tests, the above described vacuum impregnation process was employed to impregnate identical 1 inch diameter x 1 inch long graphite articles with various treat solutions listed below:

TABLE 2

| Treat Solution | Description |
|---|---|
| #1 | Hydrochloric-boric acid mixture containing ammonium phosphate and zinc introduced as a chloride. |
| #2 | Phosphoric-boric acid mixture containing zinc introduced as a phosphate. |
| #3 | Colloidal liquid aluminum phosphate. |

The percent pickup of the various reagents by the graphite samples is illustrated in Table 3.

TABLE 3.—IMPREGNATION OF GRAPHITE WITH TREAT SOLUTIONS
[Sample size: 1″ diameter x 1″ graphite (AD=1.697)]

| Sample | Percent pickup | | | | | |
|---|---|---|---|---|---|---|
|  | #1 | | #2 | | #3 | |
|  | Dried [1] | Baked [2] | Dried | Baked | Dried | Baked |
| a | 1.8 | 1.2 | 8.0 | 7.4 | 3.7 | 3.4 |
| b | 1.7 | 1.1 | 9.3 | 8.5 | 3.6 | 3.1 |
| c | 1.8 | 1.2 | 8.6 | 7.8 | 3.7 | 3.2 |
| d | 1.8 | 1.2 | 8.7 | 8.1 | 4.1 | 3.5 |
| e | 2.0 | 1.4 | 9.5 | 8.6 | 3.7 | 3.2 |
| f | 1.8 | 1.2 | 8.3 | 7.6 | 4.2 | 3.6 |
| Average N=6 | 1.8 | 1.2 | 8.7 | 8.0 | 3.8 | 3.3 |

[1] Dried at 105° C. for 24 hours.
[2] 500° C. bake (100° C./hour.)

It will be appreciated that treat solution #2 which is the subject of this invention provides a relatively greater percentage pickup of active ingredients (after baking) then either of the other prior art solutions. This is due to the greater concentration of active reagents in solution.

In other tests graphite samples (1 inch diameter x 1 inch long) were impregnated with various treat solutions in a manner similar to that above described and were subjected to oxidation tests. The oxidation tests were carried out in a specially built furnace consisting of six vertical ceramic tubes having inside diameters of 3 inches which were surrounded by a common heating coil in Nichrome wire. The overall temperature of the six station furnace was controlled automatically by a temperature controller. The 1″ diameter x 1″ samples were suspended into the six vertical furnace tubes by means of a chain made of thermocouple wire. The end faces of the cylindrical samples were covered by 1½ x 1½ x ¼ inch stainless steel discs to ensure uniform oxidation preferentially in the radial direction. A chromel-alumel thermocouple was inserted into each sample for better temperature control. The temperature of each sample was recorded by a six point recorder over a period of 24 hours.

The tests were run at temperatures ranging from 464° C. to 724° C. The wide temperature range was achieved by suspending six samples per run at different heights in the six station furnace. Air circulation (3 ft.³/hour) was supplied from a compresses airline which forced air through a drying tube and flowmeters into the bottom of the six vertical furnace tubes. The effectiveness of the various oxidation inhibitor solutions was expressed in percent weight loss per 24 hours and was determined by taking weight measurements before and after the run.

FIGURE 1 illustrates the results of these tests. In the figure, curves B and C represent the performance of graphite samples impregnated with the treat solutions designated as #1 and #3 respectively in Table 2. An examination of FIGURE 1 will indicate that the graphite sample treated with the treat solution of the invention (represented by curve D) oxidized at a rate considerably less than any of the other treated samples thereby further illustrating the superiority of the treat solution of the invention. The degree of oxidation of curve D at 721° C. is comparable to the degree of oxidation of curve C at 635° C. and of curve B at 585° C. after a 24 hour test period.

In another test 4, graphite samples (1 inch diameter x 1 inch long) were treated with various treat solutions (one sample was untreated) and were oxidized in dry air at 750° C. until total disintegration occurred. The results are illustrated in FIGURE 2 wherein it can be seen that the samples treated with the treat solution of the invention (curves D and E) withstood oxidation for a much longer time than any of the other samples. Curves B and C represent the performance of graphite treated with prior solutions designated as #1 and #3 in Table 2. It is noteworthy that the graphite sample having been impregnated with the preferred form of the treat solution of the invention resisted disintegration for at least 60 hours (curve E).

What is claimed is:

1. A treat solution which is to be applied to a carbonaceous article to provide oxidation resistance to said article, said treat solution consisting essentially of water, phosphoric acid, zinc oxide and boric acid admixed in a respective percent weight proportion of between about 19.9 to about 24: about 61 to about 65, about 13 to about 14 and about 0.98 to about 1.03.

2. The treat solution of claim 1 wherein said water, phosphoric acid, zinc oxide and boric acid are admixed in a percent weight proportion of 21.90:63.3:13.8:1.0.

3. A treat solution which is to be applied to a carbonaceous article to provide oxidation resistance to said article, said treat solution consisting essentially of water, boric acid, phosphoric acid, and zinc phosphate admixed in a respective percent weight proportion of about 24.5 to about 29.30:about 0.98 to about 1.03:about 48.3 to about 52.2:about 21.3 to about 22.4.

4. The treat solution of claim 3 wherein said water, boric acid, phosphoric acid, and zinc phosphate are admixed in a respective percent weight proportion of 27:1.0:50.3:21.7.

5. An oxidation resistant article consisting of a carbonaceous matrix selected from the group consisting of carbon and graphite having prior to baking a composition contained therein, said composition consisting essentially of boric anhydride, phosphorous pentoxide and zinc oxide in a molar ratio of between 0:1.0:0.5 and 1.0:1.0:2.0.

6. A method for providing oxidation resistance to a carbonaceous article, comprising:
 (a) impregnating said article with a composition consisting essentially of boric anhydride, phosphorous pentoxide and zinc oxide in a molar ratio of between 0:1.0:0.5 and 1.0:1.0:2.0;
 (b) drying said article; and
 (c) baking said article to form a phosphate zinc glass in the pores of said articles.

7. A method for providing oxidation resistance to a carbonaceous article comprising:
 (a) preparing a treat solution by admixing water, phosphoric acid, zinc oxide and boric acid in a respective weight percent proportion of between about 19.9 to about 24, about 61 to about 65, about 13 to about 14 and about 0.98 to about 1.03;
 (b) impregnating a carbonaceous article with said treat solution;
 (c) drying said impregnated article; and
 (d) baking said article to form a phosphate zinc glass in the pores of said article.

References Cited

UNITED STATES PATENTS 2,906,632  9/1959  Nickerson _____ 106—56

OTHER REFERENCES

Nouveau Traite De Chimie Minerale, vol. 5, p. 283, 1962.

TOBIAS E. LEVOW, *Primary Examiner.*

JAMES E. POER, *Examiner.*